Sept. 23, 1924.
T. F. BEHL
PEELING DEVICE
Filed Sept. 7, 1923
1,509,700
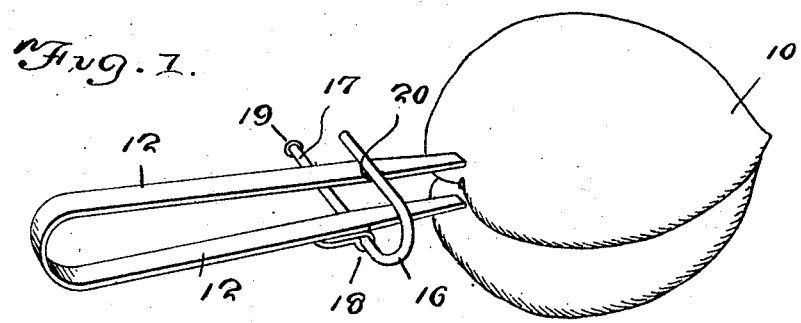
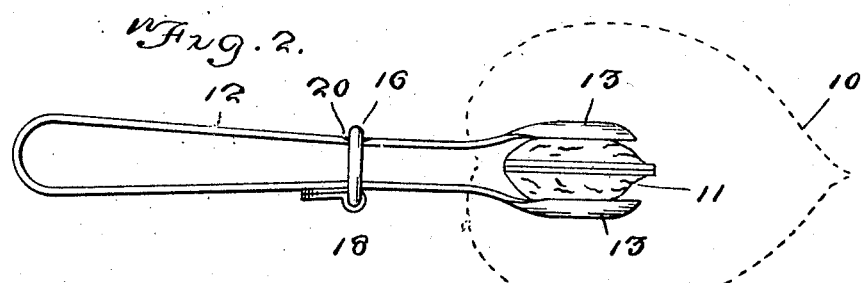
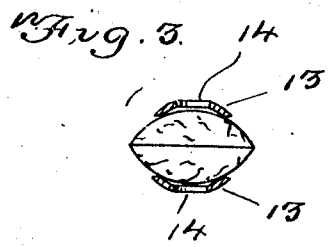
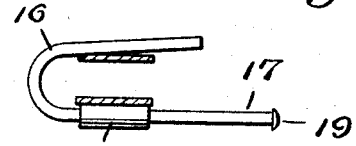
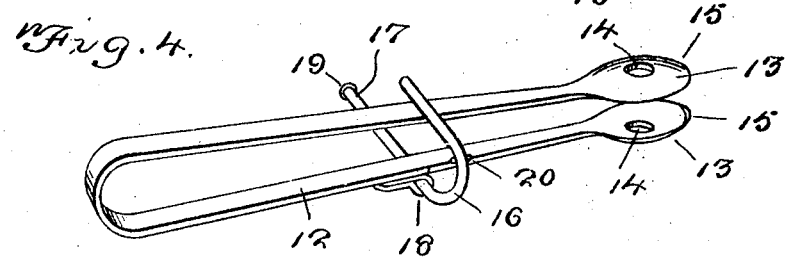
T. F. Behl
INVENTOR
BY Victor J. Evans
ATTORNEY
WITNESS:

Patented Sept. 23, 1924.

1,509,700

UNITED STATES PATENT OFFICE.

THOMAS F. BEHL, OF ALLENTOWN, PENNSYLVANIA.

PEELING DEVICE.

Application filed September 7, 1923. Serial No. 661,428.

*To all whom it may concern:*

Be it known that I, THOMAS F. BEHL, a citizen of the United States, residing at Allentown, in the county of Lehigh and State of Pennsylvania, have invented new and useful Improvements in Peeling Devices, of which the following is a specification.

This invention relates to fruit holders adapted for holding peaches or other fruit by their stones.

An object of the invention is to provide a holder whereby peaches and the like may be conveniently held when being peeled, so that the hand of the peeler need not come in contact with the peeled fruit.

Another object of the invention is to provide a simple, cheap and sanitary fruit holder which is especially adapted for use when peeling peaches preparatory to canning.

With the above and other objects in view, the invention further includes the following novel features and details of construction, to be hereinafter more fully described, illustrated in the accompanying drawings and pointed out in the appended claims.

In the drawings:—

Figure 1 is a perspective view of the invention inserted within a peach.

Figure 2 is an enlarged fragmentary sectional view of the same taken longitudinally of the holder.

Figure 3 is a transverse section.

Figure 4 is a perspective view of the holder per se with the jaws separated.

Figure 5 is an enlarged transverse sectional view.

Referring to the drawings in detail wherein like characters of reference denote corresponding parts, the reference character 10 indicates a peach whose stone or pit is indicated at 11.

The improved holder is in the form of a pair of tongs which are preferably made from a single strip of spring metal and bent to provide spring arms 12. These arms are tapered toward their outer ends and are provided with concavo-convexed gripping jaws 13 having substantially centrally located openings 14 therein. The outer ends of the gripping jaws are transversely beveled so as to provide penetrating edges 15.

The jaws are held in clamping position by means of a substantially U-shaped clamp 16, one lug 17 of which is relatively long and is slidingly and rotatably mounted in a sleeve 18 which is secured to and extends transversely of one of the spring arms 12. The arm 17 is provided with an upset portion or head 19 so as to prevent its removal from the sleeve 18.

In the use of the invention, the penetrating edges 15 are forced into the peach at its stem end so as to engage upon opposite sides of the stone 11 and when in this engaged position, the short lug of the clamp 16 is engaged over the free spring arm, a guide notch 20 being provided to facilitate this engagement. The clamp is then forced transversely across the arms 12 so that the peach stone will be securely gripped. The peach may thus be held for peeling without the holding hand coming in contact with the fruit. After the peeling has been removed, the peach may be separated into halves by inserting the knife between the spring arms and passing it around the peach, whereupon a slight twist of the knife will cause the two halves to separate leaving the stone within the jaws 13. By placing the finger against the head 19 of the clamp, the latter may be easily removed so as to separate the jaws.

The invention is susceptible of various changes in its form, proportions and minor details of construction and the right is herein reserved to make such changes as properly fall within the scope of the appended claims.

Having described the invention what is claimed is:—

1. A device for holding fruit comprising a pair of tongs, stone gripping jaws for the tongs, means whereby the jaws may be inserted into the fruit upon opposite sides of the stone and pivotally mounted means carried by and slidable transversely of the tongs for holding the jaws in gripping position.

2. A device for holding fruit comprising a pair of tongs, stone gripping jaws for the tongs, means whereby the jaws may be inserted into the fruit upon opposite sides of the stone and a substantially U-shaped member slidable transversely of and engaging the tongs for holding the ties in gripping position.

3. A device for holding fruit comprising a pair of spring tongs, opposed substantially spoon-shaped gripping members at one end thereof, penetrating edges at the outer ends of said members and a clamp for holding the gripping members in gripping position.

In testimony whereof I affix my signature.

THOMAS F. BEHL.